(12) United States Patent
Azekatsu et al.

(10) Patent No.: US 8,051,961 B2
(45) Date of Patent: Nov. 8, 2011

(54) MAGNETO-RHEOLOGICAL DAMPER

(75) Inventors: Yoshitomo Azekatsu, Wako (JP); Hajime Kajiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 560 days.

(21) Appl. No.: 12/284,762

(22) Filed: Sep. 25, 2008

(65) Prior Publication Data
US 2009/0107779 A1    Apr. 30, 2009

(30) Foreign Application Priority Data

Oct. 30, 2007 (JP) ................................. 2007-281636
Dec. 18, 2007 (JP) ................................. 2007-326254

(51) Int. Cl.
*F16F 9/53* (2006.01)
(52) U.S. Cl. ..................................... 188/267.2; 188/267
(58) Field of Classification Search .................. 188/267, 188/267.1, 267.2
See application file for complete search history.

(56) References Cited

U.S. PATENT DOCUMENTS

| | | | |
|---|---|---|---|
| 6,131,709 A * | 10/2000 | Jolly et al. | 188/267.2 |
| 6,260,675 B1 | 7/2001 | Muhlenkamp | |
| 6,311,810 B1 * | 11/2001 | Hopkins et al. | 188/267.2 |
| 6,336,535 B1 * | 1/2002 | Lisenker | 188/267.2 |
| 6,382,369 B1 * | 5/2002 | Lisenker | 188/267.2 |
| 6,390,252 B1 * | 5/2002 | Namuduri et al. | 188/267.2 |
| 6,637,556 B1 * | 10/2003 | Lun | 188/267 |
| 6,948,312 B1 * | 9/2005 | Goldasz et al. | 188/267 |
| 2004/0195062 A1 * | 10/2004 | Anderfaas et al. | 188/267.2 |

FOREIGN PATENT DOCUMENTS

| | | |
|---|---|---|
| JP | S59-11934 U | 7/1982 |
| JP | 2007-255705 A | 10/2007 |
| JP | 2007-263221 A | 10/2007 |
| JP | 2007-303582 A | 11/2007 |

\* cited by examiner

*Primary Examiner* — Thomas J Williams
(74) *Attorney, Agent, or Firm* — Carrier Blackman & Associates, P.C.; Joseph P. Carrier; William D. Blackman

(57) ABSTRACT

In a magneto-rheological variable damper (6), the piston (16) comprises an inner yoke (32), an outer yoke (31) concentrically surrounding the inner yoke and held in position by pair of end plates (33, 34) made of non-magnetic material and disposed on either axial end surfaces of the piston. The piston may be circumferentially surrounded by a piston cover (30) that may be made of non-magnetic material and serves a slide member that engages the inner circumferential surface of a cylinder (12). Alternatively, the end plates may serve as the slide member. In either case, the durability of the damper can be improved by using a wear resistant material for the slide member. In particular, the outer yoke may be made of material such as Permendur which has a high saturation magnetic flux density but a poor mechanical property. Thereby, the range of the damping force can be expanded. The slide member may be made of non-magnetic material having a favorable wear resistance such as austenite stainless steel and aluminum alloy. It is also possible to apply a plating or other surface processing to the sliding surface of the slide member to improve the wear resistance thereof.

9 Claims, 7 Drawing Sheets

MAGNETO-RHEOLOGICAL DAMPER

CROSS REFERENCE TO COPENDING APPLICATION(S)

U.S. patent application Ser. No. 11/954,292 filed Dec. 12, 2007

TECHNICAL FIELD

The present invention relates to a variable shock absorber or damper that can produce a variable damping force for use in an automotive wheel suspension system, and in particular to a variable damper that is highly durable in use and can vary the damping force over a wide range.

BACKGROUND OF THE INVENTION

Various forms of variable dampers have been proposed for use in wheel suspension systems for the purposes of improving the ride quality and achieving a motion stability of the vehicle. In a common conventional variable damper, a rotary valve is incorporated in the piston for varying an effective area of an orifice that communicates the two chambers on either side of the piston with each other, and such a rotary valve is typically actuated mechanically by using a suitable actuator. More recently, it has become more common to use magneto-rheological fluid for the actuating fluid of the damper, and control the viscosity of the fluid by supplying corresponding electric current to a magnetic coil which is incorporated in the piston. According to such an arrangement, the overall structure can be simplified, and the response property of the damper can be improved. See U.S. Pat. No. 6,260,675, for instance.

The piston of the damper disclosed in U.S. Pat. No. 6,260,675 comprises a cylindrical inner yoke, a coil wound around the outer periphery of the inner yoke, a pair of end plates placed on either axial end of the inner yoke, and a cylindrical outer yoke coaxially surrounding the inner yoke and end plates. The inner yoke and outer yoke are both made of magnetic material, and are retained in a spaced apart relationship by the end plates so as to define an annular flow passage between them. The end plates typically consist of disks made of non-magnetic material, and are each provided with a plurality of arcuate slots communicating with the annular passage, an annular recess for engaging a projection on the corresponding axial end of the inner yoke and an annular groove for engaging a ring that secures the inner end of the piston rod to the piston. The inner yoke, end plates and outer yoke are securely attached to one another by crimping each axial end of the outer yoke against the peripheral edge of the corresponding end plate.

In such a damper, it has been a common practice to use carbon steel as the material for the outer yoke because carbon steel is a soft magnetic material and has a favorable mechanical property. However, the saturation magnetic flux density of carbon steel is not very high so that the variable range of the damping force cannot be made so wide as desired. The inventors experimented the use of soft magnetic materials including iron-cobalt alloy (such as Permendur) having high saturation magnetic flux densities, but such materials do not have a high hardness, and have relatively poor elongation and drawing properties. Therefore, such materials were not found to be suitable for use in the outer yoke of conventional magneto-rheological dampers.

More specifically, if material such as Permendur is used for the outer yoke which forms the outermost shell of the piston in the damper disclosed in U.S. Pat. No. 6,260,675, because the outer circumferential surface of the outer yoke constantly slides over the inner circumferential surface of the cylinder during use, the outer yoke wears out very rapidly. Wear in the outer yoke creates a play between the piston and cylinder in time, and this play not only causes noises but also reduces the damping force due to leakage of magnetic fluid through the play between the piston and cylinder.

Also, in the damper disclosed in U.S. Pat. No. 6,260,675, the axial ends of the outer yoke are crimped onto the axial end surfaces of the end plates so as to integrally hold the end plates, inner yoke and outer yoke together. However, material such as Permendur having a poor drawing property is not suitable for crimping.

BRIEF SUMMARY OF THE INVENTION

In view of such problems of the prior art, a primary object of the present invention is to provide a variable damper which can be made highly compact without impairing the performance of the damper.

A second object of the present invention is to provide a variable damper which can vary the damping force thereof over a wide range.

A third object of the present invention is to provide a variable damper which is durable in use.

According to the present invention, at least one of such objects can be accomplished by providing a variable damper, comprising: a cylinder filled with magnetic fluid or magneto-rheological fluid therein and having an end connected to one of a vehicle side member and a wheel side member; a piston slidably received in the cylinder to separate an interior of the cylinder into two chambers and provided with a flow passage communicating the two chambers; and a piston rod extending out of an end of the cylinder remote from the one end thereof, and having an outer end connected to the other of the vehicle side member and the wheel side member and an inner end connected to the piston; the piston comprising a cylindrical outer yoke defining an outer peripheral part of the piston, an inner yoke coaxially received in the outer yoke at a prescribed gap and a coil retained in the inner yoke to provide a magnetic flux extending across the gap, the gap providing at least a part of the flow passage; the piston further comprising a slide member defining a space between an outer circumferential surface of the outer yoke and an inner circumferential surface of the cylinder.

Thus, the durability of the damper can be improved by using a wear resistant material for the slide member. In particular, the outer yoke may be made of material such as Permendur which has a high saturation magnetic flux density but a poor mechanical property. Thereby, the range of the damping force can be expanded.

The slide member may be made of non-magnetic material having a favorable wear resistance such as austenite stainless steel and aluminum alloy. It is also possible to apply a plating or other surface processing to the sliding surface of the slide member to improve the wear resistance thereof.

According to a preferred embodiment of the present invention, the slide member comprises a piston cover that covers an outer circumferential surface of the outer yoke. Thus, the leakage of magnetic flux from the outer yoke is reduced so that the damping force can be increased for a given drive current. The piston cover may comprise a pair of axial ends crimped onto corresponding axial ends of the piston. Thereby, the number of components can be reduced and the assembly process can be simplified. According to a particularly preferred embodiment of the present invention, the piston further comprises a pair of end plates disposed on either axial end of the inner yoke, and held in position by the axial ends of the piston cover crimped thereon, each end plate being made of non-magnetic material and provided with openings along an outer periphery thereof so as to form a part of the flow passage.

According to a certain aspect of the present invention, the piston further comprises a pair of end plates each fixedly secured to either axial end of the inner yoke and provided with an annular shoulder for fixedly clamping the outer yoke in a coaxial and spaced relationship to the inner yoke. Also, each axial end of the inner yoke and an opposing face of the corresponding end plate may be provided with mutually corresponding annular shoulders to hold the end plate in a coaxial relationship to the inner yoke. Thereby, the leakage of the magnetic flux in the axial direction can be minimized, and the damping force can be maximized for a given drive current. Also, the various components can be integrally held together in a coaxial relationship at a high precision in a simple manner.

According to another aspect of the present invention, the inner yoke is provided with a central bore having a first end receiving an inner end of the piston rod and a second end closed by a liquid tight plug, and the piston rod is provided with a central bore for passing a lead wire electrically connecting the coil to an external circuit, a seal member being interposed between the piston rod and a wall of the central bore of the inner yoke to seal off the magnetic fluid from the central bore of the piston rod. Thus, the lead wire for the coil can be conveniently led out from the piston rod to an external circuit, and is favorably sealed off from the magnetic fluid.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
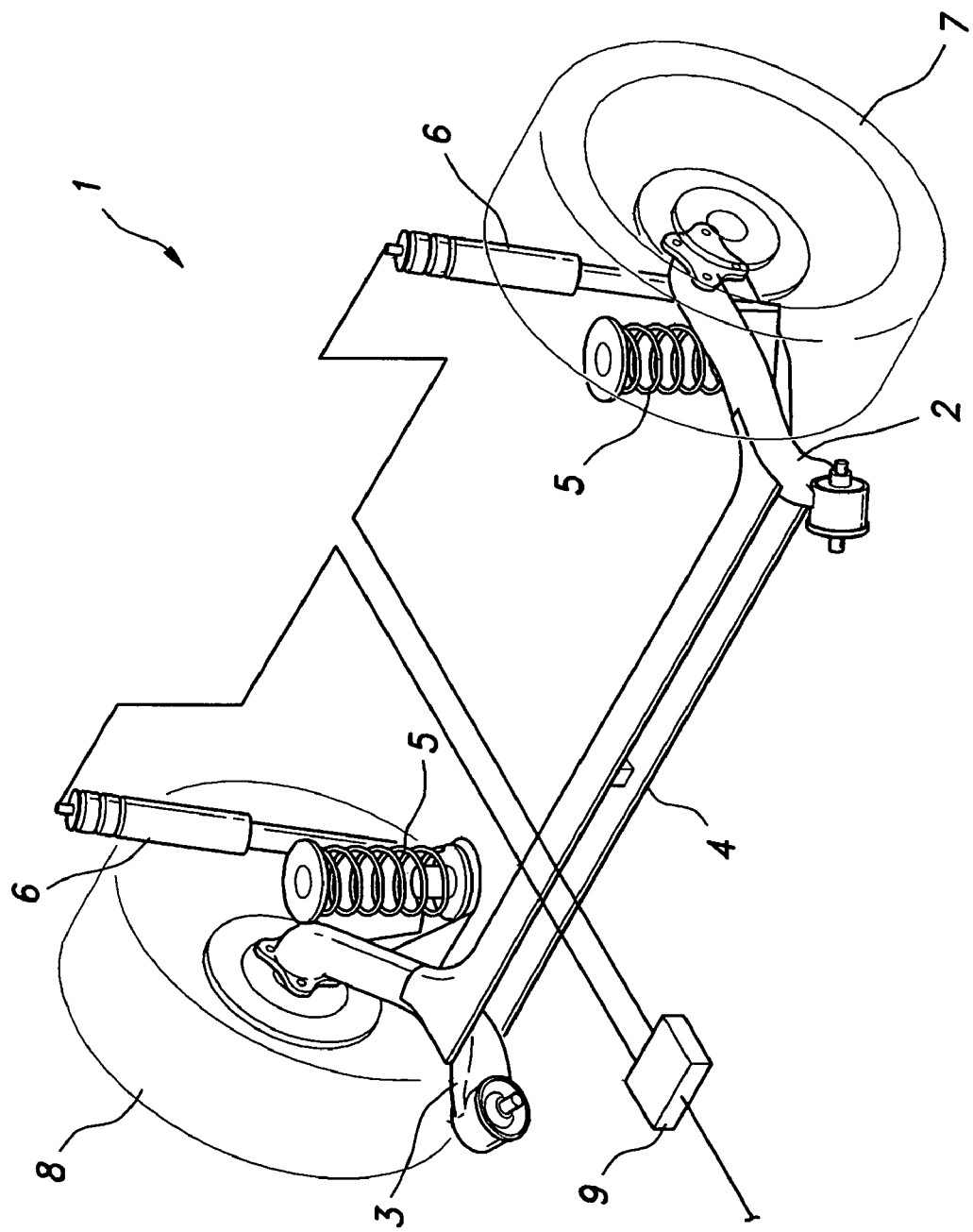
FIG. 1 is a perspective view of a rear wheel suspension system to which the present invention is applied.

FIG. 1 shows a rear wheel suspension system 1 consisting of a H-shaped torsion beam suspension system to which the present invention is applied. This suspension system comprises a pair of trailing arms 2 and 3, a torsion beam 4 connecting intermediate parts of the trailing arms 2 and 3 with each other, a pair of suspension springs 5 consisting of coil springs for the corresponding trailing arms, respectively, and a pair of dampers 6 for the corresponding trailing arms. Each damper 6 consists of a variable damping force damper using MRF (Magneto-Rheological Fluid), and is configured to vary the damping force thereof under the control of an ECU 9 mounted in a car trunk or the like.

Figure 2:
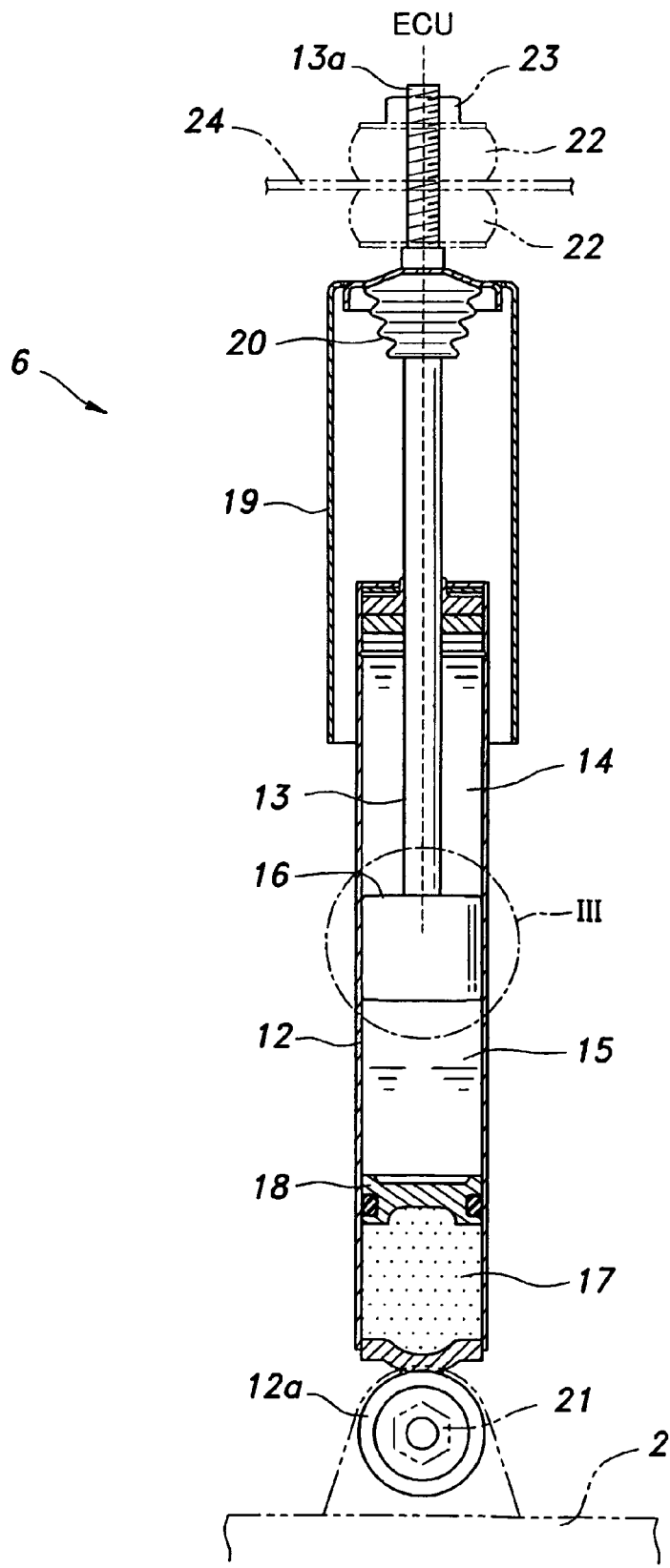
FIG. 2 is a vertical sectional view of a first embodiment of the variable damper according to the present invention.

As shown in FIG. 2, the damper 6 of the illustrated embodiment consists of a monotube type comprising a cylindrical cylinder 12 filled with MRF, a piston rod 13 extending out of the cylinder 12 in a slidable manner, a piston 12 attached to the inner end of the piston rod 13 and separates the interior of the cylinder 12 into an upper chamber 14 and a lower chamber 15, a free piston 18 defining a high pressure gas chamber 17 in a lower part of the cylinder 12, a cylindrical cover 19 having a larger inner diameter than the outer diameter of the cylinder 12 and attached to the piston rod 13 in a coaxial relationship to the cylinder 12 to protect the piston rod 13 from contamination, and a bump stopper 20 attached to the piston rod 13 to define the limit of movement of the damper 6 at the time of full bound in a resilient manner.

The cylinder 12 is connected to a bracket formed in the upper surface of the corresponding trailing arm 2 via a bolt 21 passed through the bracket and an eyepiece 12a formed in the lower end of the cylinder 12. The upper end of the piston rod 13 is provided with a threaded portion 13a which is connected to a damper base 24 (formed in an upper part of a wheel house) vcia a pair of rubber bushes 23 interposing a damper base member and a nut 23 threaded onto the piston rod 13.

Figure 3:
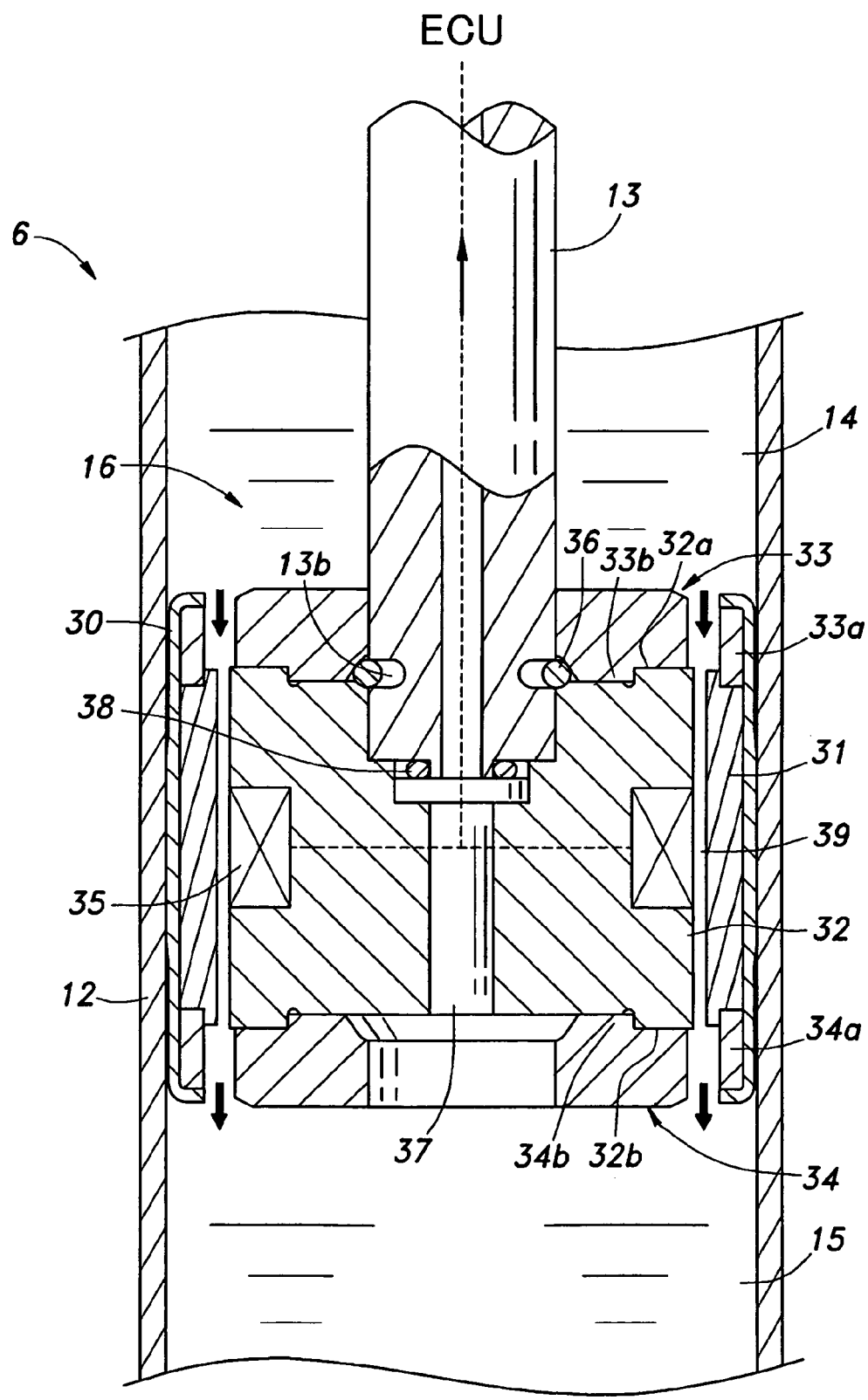
FIG. 3 is an enlarged view of a part of FIG. 2 indicated by a circle III.
Figure 4:
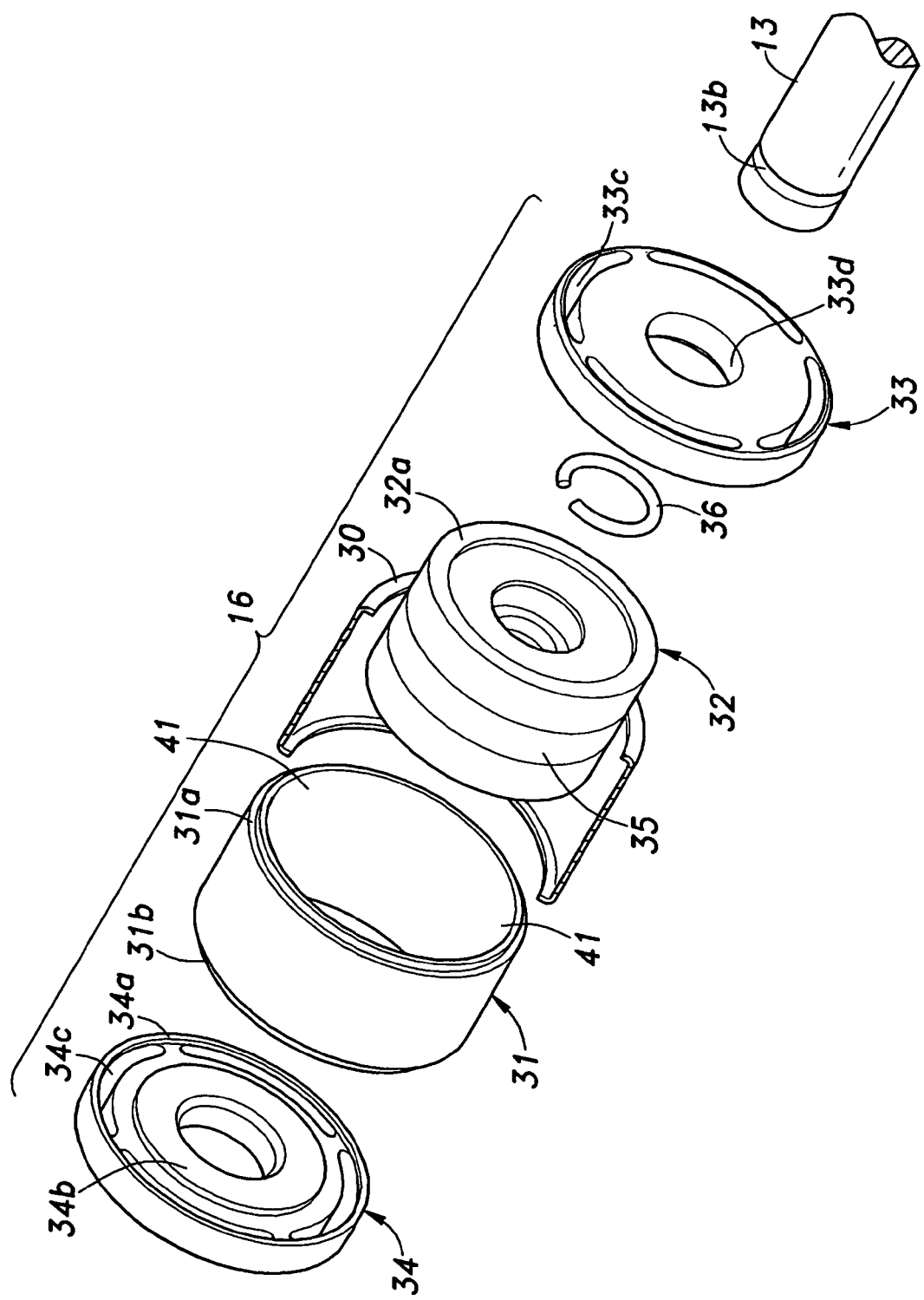
FIG. 4 is an exploded perspective view of the piston assembly partly in section.

The piston 16 is incorporated with a magnetizable liquid valve (MLV) as will be described hereinafter. As shown in FIGS. 3 and 4, the piston 16 comprises a piston cover 30 covering the outer periphery of the piston 16 and having an outer circumferential surface slidably engaging the inner circumferential surface of the cylinder 12, an outer yoke 31 formed as a cylindrical thin shell member and retained immediately inside the piston cover 30, an inner yoke 32 formed as a cylindrical member coaxially disposed inside the outer yoke 31, a pair of end plates 33 and 34 consisting of disk members mounted on either axial end of the inner yoke 32 in a coaxial relationship, an MLV coil 35 received in an annular groove formed around an axially central part of the outer periphery of the inner yoke 32 and molded therein with resin and an engagement ring 36 holding the piston rod 13 to the piston 16. The upper end plate 33 is provided with a central opening 33d for receiving the piston rod 13, and the inner yoke 32 is provided with a central bore including a section of a relatively large diameter at an upper end thereof so as to receive the inner end of the piston rod 13.

The outer yoke 31, inner yoke 32 and end plates 33 and 34 are integrally held together by crimping the axial ends of the piston cover 30 onto the outer axial end surfaces of the corresponding end plates 33 and 34. The end plates 33 and 34 are provided with axial flanges 33a, 34a directed toward each other along the outer peripheries thereof (thereby defining annular shoulders), and the outer yoke 31 is provided with an annular shoulder 31a, 31b on an outer periphery of each axial end thereof. Each axial end of the outer yoke 31 fits into the interior of the corresponding axial flange 33a, 34a, and the axial end of the axial flange 33a, 34a rests upon the corresponding annular shoulder 31a, 31b. The circumferential surfaces of the end plates 33 and 34 and the outer yoke 31 jointly define a flush cylindrical surface which is in close contact with the inner surface of the piston cover 30.

The engagement ring 36 consists of a wire member made of spring steel formed into the shape of letter C. The piston rod 13 is provided with an annular groove 13b, and a corresponding annular groove is formed in an axial bore of the piston 16 for receiving the piston rod 13 at an interface between the upper end plate 33 and inner yoke 32. When assembling the piston 16, the engagement ring 36 is initially pushed into the annular groove 13b of the piston rod 13, and once the corresponding end of the piston rod 13 is introduced into the corresponding axial bore of the piston 16, the engagement ring 36 is allowed to expand into the annular groove formed in the bore. Because the annular groove formed in the bore of the piston is not deep enough to entirely receive the engagement ring 36, the piston rod 13 is joined to the piston 16 by the engagement ring 36. The bore in the piston 16 is passed entirely axially through the inner yoke 32, but is closed by a plug 37 at the opposite axial end having a relatively smaller inner diameter, and an O-ring 38 is interposed between the piston rod 13 and bore to achieve a required sealing of the lead wires for the MLV coil 35.

The piston cover 30 of the illustrated embodiment is made of non magnetic material such as austenite stainless steel which may be SUS304 or SUS316 (JIS), and the outer yoke 31 is made of soft magnetic material such as Permendur (trade name: high magnetic permeability alloy containing iron an cobalt by about a same amount). However, it is also possible that the piston cover 30 is made of other non-magnetic material such as aluminum alloy or magnetic material such as carbon steel. Likewise, the outer yoke 31 may be made of other suitable soft magnetic material having a relatively high saturation magnetic flux density. The outer circumferential surface of the outer yoke 31 is spaced (by a gap substantially equal to the thickness of the piston cover 30) from the inner circumferential surface of the cylinder 12.

The inner yoke 32 is a solid integral member made of magnetic material such as S25C and other carbon steels, and is provided with axial flanges 32a and 32b on the end surfaces thereof at the outer periphery thereof. Each end plate 33, 34 is provided with a central projection 33b, 34b that fits into the interior of the corresponding axial flange 32a, 32b. The inner circumferential surface of the outer yoke 31 opposes the outer circumferential surface of the inner yoke 32 with a certain annular gap defined therebetween. The end plates 33 and 34 are made of non-magnetic material such as aluminum alloy that may be Duralumin (or other durable material such as austenite stainless steel), and each provided with four arcuate through holes 33c, 34c along an outer periphery thereof. Thereby, an annular passage 39 extending axially across the piston 16 is defined by the through holes 33c and 34c of the end plates 33 and 34 and the annular gap between the inner yoke 32 and outer yoke 31.

When the vehicle is in motion, the ECU 9 determines a target damping force for each of the wheels according to the accelerations of the vehicle obtained from a fore-and-aft G sensor, a lateral G sensor and a vertical G sensor, the vehicle speed obtained from a vehicle speed sensor, the rotational speed of each wheel and other data, and supplies a corresponding electric current to each MLV coil 35. The electric current causes a change in the viscosity of the MRF flowing through the annular passage 39, and this causes a corresponding increase or decrease of the damping force of the damper 6.

In the disclosed embodiment, because the outer yoke 31 is made of Permendur having a high magnetic permeability and a high saturation magnetic flux density, although it has a relatively small thickness, a strong magnetic field is produced in the piston 16. Therefore, combined with the contribution of the piston cover 30 made of non-magnetic material in controlling the leakage of magnetic flux, a relatively large damping force or a large dynamic range of the damping force can be achieved.

Figure 5:
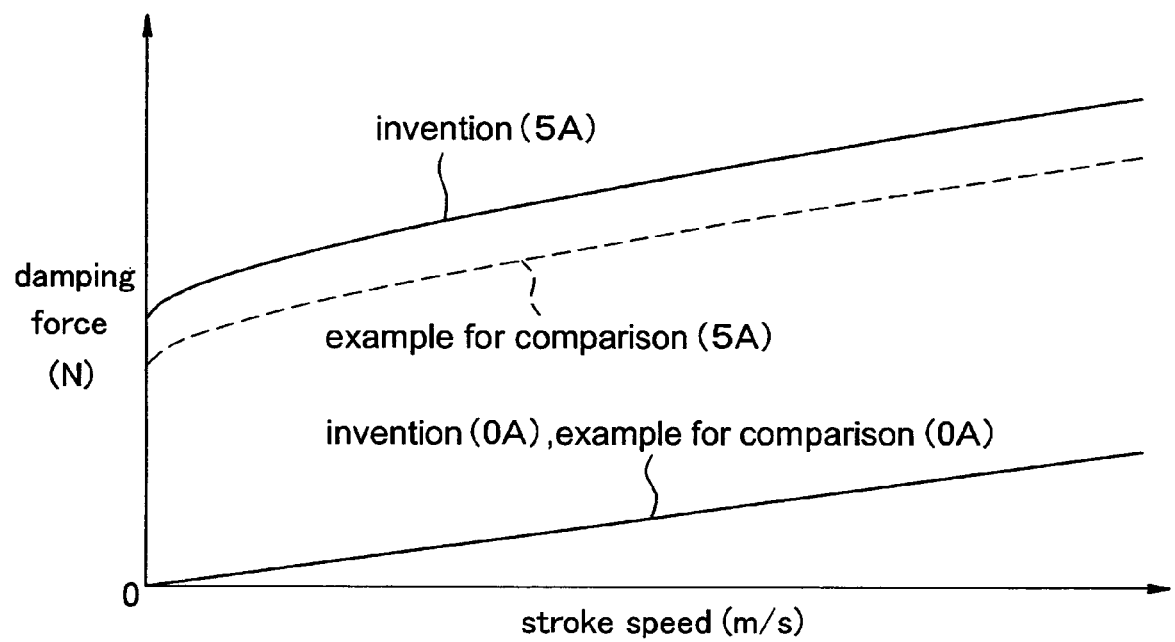
FIG. 5 is a graph showing the relationship between the stoke speed and damping force under a zero drive current condition and a maximum drive current condition.

FIG. 5 is a graph showing the relationship between the damping force and stroke speed when a drive current is supplied to the MLV coil 35 and no drive current is supplied to the MLV coil 35. The illustrated embodiment is compared with an example which is identically constructed and identically dimensioned except for that the outer yoke is made of carbon steel (S25C). When no drive current is supplied, the illustrated embodiment and example for comparison demonstrate an identical relationship between the stroke speed and damping force. When a maximum drive current is supplied to the MLV coil 35 (5 A in the illustrated embodiment), the damping force of the illustrated embodiment (solid line) is significantly greater than that of the example for comparison (dotted line) over the entire range of the stroke speed.

The piston cover 30 is made of stainless steel that is known to have a high wear resistance so that the damper 6 is highly durable in use. Also, austenite stainless steel demonstrates a favorable extension and drawing capability so that the crimping work can be performed with ease, and this improves the efficiency of the assembly work.

Figure 6:
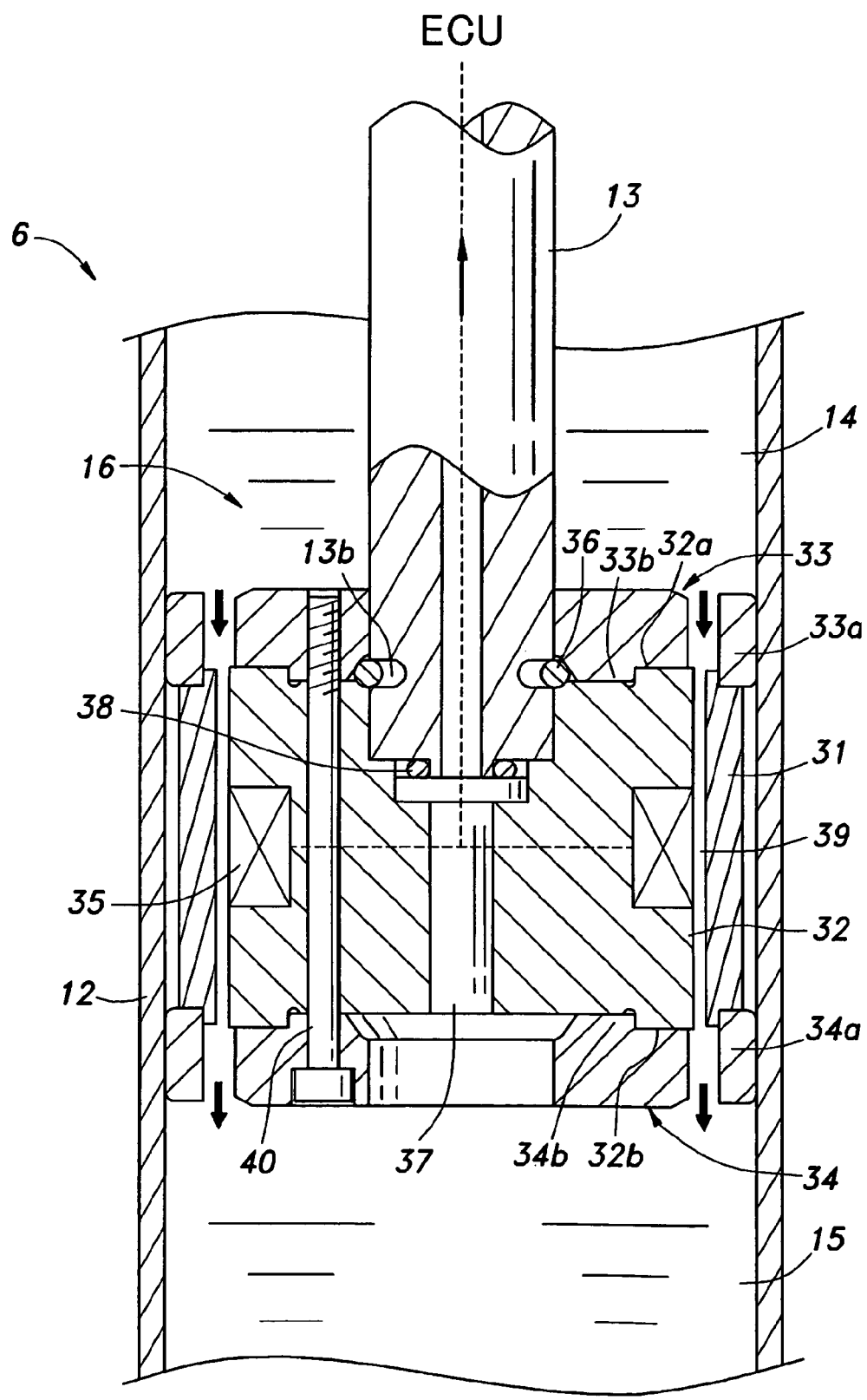
FIG. 6 is a view similar to FIG. 3 showing a second embodiment of the present invention.

FIG. 6 shows a second embodiment of the present invention. The parts corresponding to those of the previous embodiment are denoted with like numerals without repeating the description of such parts to avoid redundancy.

In the second embodiment, no piston cover is used. The end plates 33 and 34, inner yoke 32 and outer yoke 31 are held integrally together by a plurality of threaded bolts 40 passed axially through the end plates 33 and 34 and inner yoke 32. In this embodiment also, the outer yoke 31 is made of Permendur, and the outer circumferential thereof opposes the inner circumferential surface of the cylinder 12 with an annular gap defined therebetween owing to the end plates 33 and 34 that clamp the inner yoke 32 between them. The end plates 33 and 34 have a larger outer diameter than the outer yoke 31 so that the outer circumferential surfaces of the end plates 33 and 34 are in sliding engagement with the inner circumferential surface of the cylinder 12 while the outer circumferential surface of the outer yoke 31 is spaced from the inner circumferential surface of the cylinder 12 by a small gap. If desired, the end plates 33 and 34 may be made of any non-magnetic wear resistant material and/or may be surface coated or processed at the outer circumferential surfaces thereof so that a desired durability may be achieved.

Figure 7:
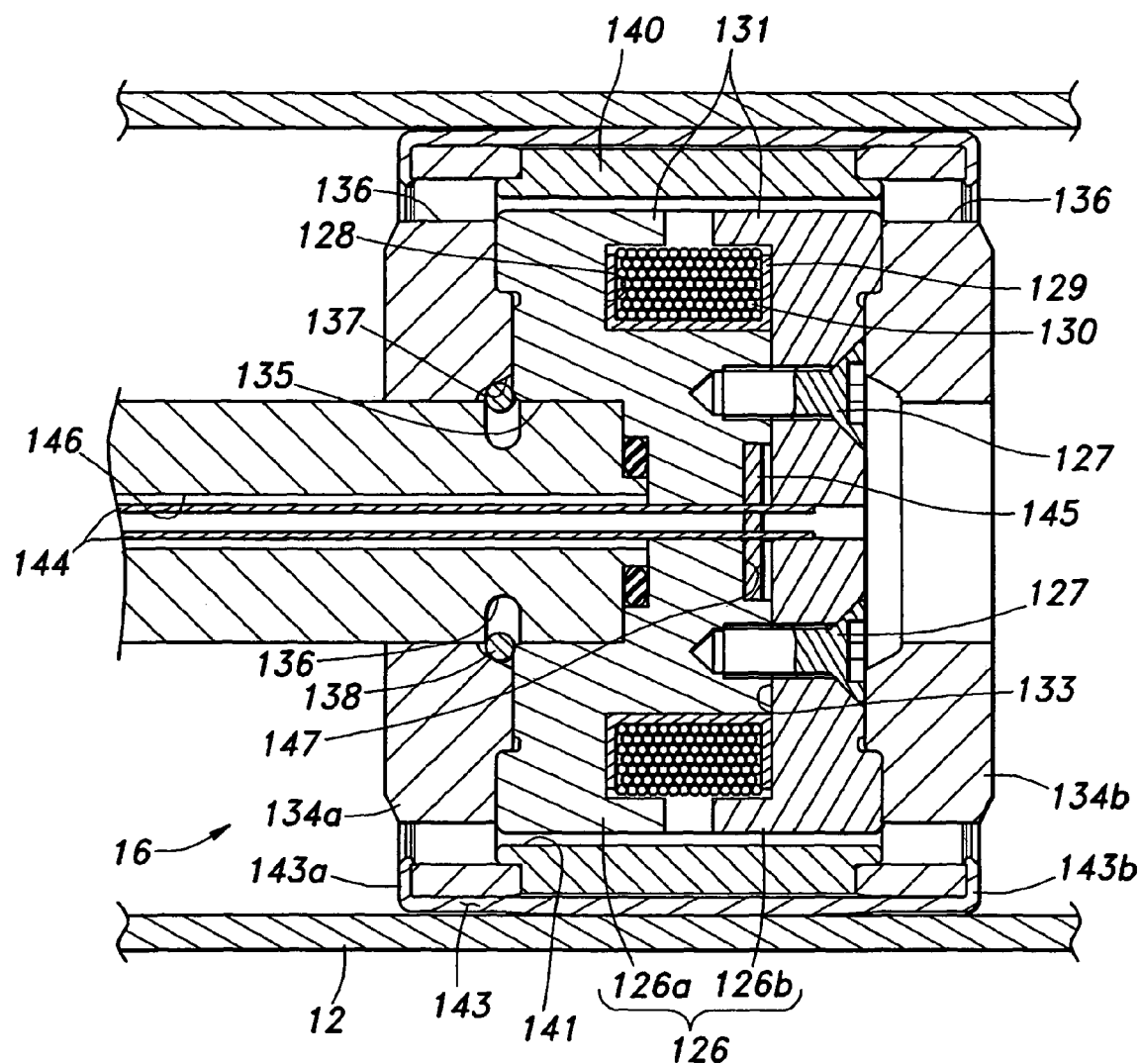
FIG. 7 is a view similar to FIG. 3 showing a third embodiment of the present invention.

FIG. 7 shows a third embodiment of the present invention. The piston 16 comprises a substantially solid cylindrical inner yoke 126 made of magnetic material, and an end of the piston rod 13 is received in a hole 135 formed centrally in an axial end of the inner yoke 126. The inner yoke 126 consists of axially separated two parts 126a and 126b which are integrally and axially joined to each other by four threaded bolts 127 passed into the inner yoke 126 from the axial end remote from the piston rod 113.

The outer circumferential surface of the inner yoke 126 is formed with an annular groove 128 in an axially central part thereof, and a coil 130 is received therein via a coil bovine 129. In this case also, the coil 130 is wound in the circumferential direction, and molded in resin. The outer peripheral part of the annular groove 128 is provided with axial extensions 131 formed by extending parts of the inner yoke 126 from the both axial ends into the peripheral part of the coil 130. In the illustrated embodiment, the axial extensions 131 extend from the both axial ends in a symmetric manner. The outer circumferential surface of the inner yoke 128 generally defines a cylindrical surface having a fixed radius, and the parts thereof located on either axial side of the annular groove 128 form pole pieces 32a and 32b.

The parting plane between the two parts of the inner yoke 126 is located on the same plane as a side surface of the annular groove 128 remote from the piston rod 13. An end plate 134 (134a, 134b) made of non-magnetic material is placed on each end surface of the inner yoke 126, and the piston rod 13 is passed through a central opening of the end plate 134a facing the piston rod 13. Each end plate 134 is formed with four arcuate slots 136 extending along a common concentric circle adjacent to the outer peripheral edge thereof at a regular angular interval.

A cylindrical flux ring or outer yoke 140 is interposed between the peripheral edges of the two ends plates 134 so that the inner circumferential surface of the outer yoke 140 opposes the outer circumferential surface of the inner yoke 126 at a prescribed gap 141 in a concentric relationship. The outer yoke 140 is made of Permndur or other material having a favorable magnetic property. The outer circumferential surface jointly defined by the outer yoke 140 and the two end plates 134 and having a fixed radius is covered by a cylindrical piston cover 143 (which may be made of non-magnetic material such as austenite stainless steel, aluminum alloy or other wear resistant material), and each axial end 143a, 143b thereof is crimped onto the outer peripheral part of the corresponding end plate 134 so that the two end plates 134, inner yoke 26 and outer yoke 140 are held in a fixed manner. If desired, the piston cover 143 may also be made of magnetic wear resistant material.

The peripheral part of the central opening of the end plate 134 is formed with a beveled portion 137 that faces inwardly toward the center of the piston 16 and the corresponding outer circumferential surface of the piston rod 13 is formed with an annular groove 136, and a C ring 138 is received in an annular recess jointly formed by the beveled portion 137 and annular groove 136 so as to secure the piston rod 13 with respect to the piston 16.

The piston rod 13 is internally provided with an axial bore 146 which coaxially aligns with a similar bore formed in the inner yoke 126. The end surface of the inner yoke part 126a facing the other inner yoke part 126 is formed with a central recess 147 that receives a hermetic seal member 145 therein. Lead wires 144 of the coil 130 are passed through the axial bore 146 of the piston rod 13 and the central bore of the inner yoke 126, and is then sealably passed through the hermetic seal member 145. The lead wires 144 are then passed through a groove (not shown in the drawing) extending radially along the end surface (parting plane 133) of either one of the inner yoke parts 126a and 126b, and reach the coil 130. An O ring is provided in the bottom part of the hole 135 to seal off the central bore 144 of the piston rod 13 from the MRF. The peripheral part of the hermetic seal member 145 is welded to the corresponding part of the inner yoke 126 to achieve a liquid tight seal for a similar purpose.

The mode of operation of this damper is described in the following. When the corresponding wheel moves relatively to the vehicle body owing to the movement of the vehicle, this displacement is transmitted to the piston 16 via the piston rod 13, and causes a relative displacement between the piston 16 and cylinder 12. As a result, the volumes of the two chambers 14 and 15 change, and the MRF is forced to flow through the flow passage formed by the arcuate slots 136 of one of the end plates 134a, the gap 141 between the inner yoke and outer yoke and the arcuate slots 136 of the other end plate 134b. When the coil 130 is not energized, the MRF is allowed to flow without encountering any significant resistance, and produces a relatively low damping force which is substantially proportional to the relative speed between the piston 16 and cylinder 12. When the coil 130 is energized, the magnetic field produced in the gap 141 applies a relatively strong flow resistance to the MRF that flows through the gap 141, and this produces a relatively high damping force which is substantially proportional to the relative speed between the piston 16 and cylinder 12. Thus, by supplying controlled electric current to the coil 130, a desired damping control can be achieved.

Thus, even though Permndur or material having a favorable magnetic property (high saturation magnetic flux density) but a poor mechanical property is used for the outer yoke 140, a high durability and reliability can be achieved.

The dampers of the illustrated embodiments were for use in rear wheel suspension systems of four wheel motor vehicles, but may also be used for front wheel suspension systems of four wheel motor vehicles. Likewise, the damper of the present invention can be used for motorcycles and three-wheel motor vehicles as well.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as any prior art mentioned therein are incorporated in this application by reference.

The invention claimed is:

1. A variable damper, comprising:
    a cylinder filled with magnetic fluid or magneto-rheological fluid therein and having an end connected to one of a vehicle side member and a wheel side member;
    a piston slidably received in the cylinder to separate an interior of the cylinder into two chambers and provided with a flow passage communicating the two chambers; and
    a piston rod extending out of an end of the cylinder remote from the one end thereof, and having an outer end connected to the other of the vehicle side member and the wheel side member and an inner end connected to the piston;
    the piston comprising a cylindrical outer yoke defining an outer peripheral part of the piston, an inner yoke coaxially received in the outer yoke at a prescribed gap and a coil retained in the inner yoke to provide a magnetic flux extending across the gap, the gap providing at least a part of the flow passage;
    the piston further comprising a slide member defining a space between an outer circumferential surface of the outer yoke and an inner circumferential surface of the cylinder,
    wherein the slide member comprises a piston cover that covers an outer circumferential surface of the outer yoke;
    wherein the piston cover comprises a pair of axial ends crimped onto corresponding axial ends of the piston; and
    wherein the piston further comprises a pair of end plates disposed on either axial end of the inner yoke, and held in position by the axial ends of the piston cover crimped thereon, each end plate being made of non-magnetic material and provided with openings along an outer periphery thereof so as to form a part of the flow passage.

2. The variable damper according to claim 1, wherein the outer yoke has a higher saturation magnetic flux density than the slide member.

3. The variable damper according to claim 1, wherein the outer yoke comprises Permendur.

4. The variable damper according to claim 1, wherein the slide member comprises non-magnetic material.

5. The variable damper according to claim 4, wherein the slide member comprises austenite stainless steel.

6. The variable damper according to claim 4, wherein the slide member comprises aluminum alloy.

7. The variable damper according to claim 1, wherein the piston further comprises a pair of end plates each fixedly secured to either axial end of the inner yoke and provided with an annular shoulder for fixedly clamping the outer yoke in a coaxial and spaced relationship to the inner yoke.

8. The variable damper according to claim 7, wherein each axial end of the inner yoke and an opposing face of the corresponding end plate are provided with mutually corresponding annular shoulders to hold the end plate in a coaxial relationship to the inner yoke.

9. A variable damper, comprising:
- a cylinder filled with magnetic fluid or magneto-rheological fluid therein and having an end connected to one of a vehicle side member and a wheel side member;
- a piston slidably received in the cylinder to separate an interior of the cylinder into two chambers and provided with a flow passage communicating the two chambers; and
- a piston rod extending out of an end of the cylinder remote from the one end thereof, and having an outer end connected to the other of the vehicle side member and the wheel side member and an inner end connected to the piston;
- the piston comprising a cylindrical outer yoke defining an outer peripheral part of the piston, an inner yoke coaxially received in the outer yoke at a prescribed gap and a coil retained in the inner yoke to provide a magnetic flux extending across the gap, the gap providing at least a part of the flow passage;
- the piston further comprising a slide member defining a space between an outer circumferential surface of the outer yoke and an inner circumferential surface of the cylinder,
- wherein the slide member comprises a piston cover that covers an outer circumferential surface of the outer yoke;
- wherein the piston cover comprises a pair of axial ends crimped onto corresponding axial ends of the piston; and
- wherein the inner yoke is provided with a central bore having a first end receiving an inner end of the piston rod and a second end closed by a liquid tight plug, and the piston rod is provided with a central bore for passing a lead wire electrically connecting the coil to an external circuit, a seal member being interposed between the piston rod and a wall of the central bore of the inner yoke to seal off the magnetic fluid from the central bore of the piston rod.

* * * * *